(No Model.)
PIERRE AMBJORN COMTE DE SPARRE.
BICYCLE FRAME.
No. 592,755. Patented Nov. 2, 1897.
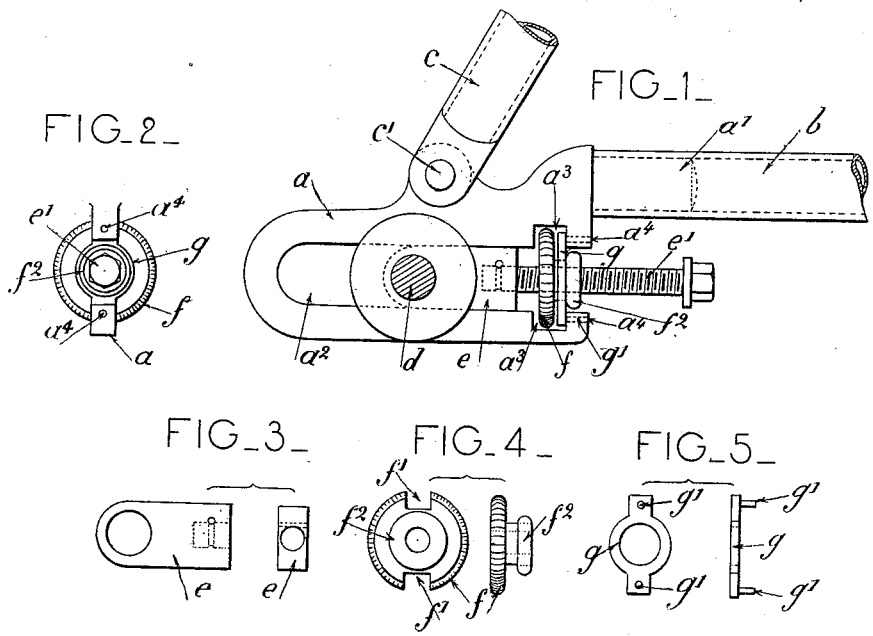

UNITED STATES PATENT OFFICE.

PIERRE AMBJORN COMTE DE SPARRE, OF PARIS, FRANCE.

BICYCLE-FRAME.

SPECIFICATION forming part of Letters Patent No. 592,755, dated November 2, 1897.

Application filed December 13, 1894. Serial No. 531,627. (No model.) Patented in France November 7, 1894, No. 242,683.

*To all whom it may concern:*

Be it known that I, PIERRE AMBJORN COMTE DE SPARRE, civil engineer, a subject of the King of Sweden and Norway, and a resident of 16 Place de la Madeleine, Paris, in the Republic of France, have invented certain new and useful Improvements in Bicycle-Frames, (for which I have obtained Letters Patent of France, dated November 7, 1894, No. 242,683,) of which the following is a specification.

My invention has for its object to provide improved means for mounting the propelling-wheels of bicycles upon their frames, whereby the tension of the chain may be readily regulated.

It consists of a fork or abutment with proper securing devices to be employed in mounting such a wheel upon a frame and in adjusting its position with reference thereto. The mounting and dismounting of the wheels can thus be performed simply and quickly, and the adjustment of the tension of the chain is thereby made very easy.

In the accompanying drawings, Figure 1 represents a side elevation of the complete device for mounting the propelling-wheel. Fig. 2 is an end view of part of the device, and Figs. 3, 4, and 5 are details of different portions of the device illustrated in Fig. 1.

The eyepiece $a$, the shape and proportions of which are clearly indicated in Fig. 1, serves to unite the branches $b$ and $c$ on the same side of the horizontal and of the rising forks of the bicycle-frame, between which the propelling-wheel is located.

The branch $c$ of the rising fork is hinged at $c'$ in the eyepiece, and the tube of the horizontal fork $b$ is adjusted and fixedly secured to a tenon $a'$ on the same part $a$. In the eye $a^2$ of the connecting-piece $a$ the axle $d$ of the bicycle-wheel is permitted to slide. The adjustment of the position of said axle in the eye, and therefore the adjustment of the tension of the chain, are accomplished in the following manner:

The axle $d$, which does not slide directly upon the edges of the eye, is in engagement with a piston $e$, formed as a shoe, Fig. 3, which performs the office of a cushion. By means of a screw $e'$ such shoe-piston, and therefore the axle of the wheel, can be moved forward and backward within the eye $a^2$. The screw $e'$ is adapted to turn in a screw-nut $f$, Fig. 4, which is provided with two notches $f'$, placed diametrically opposite each other and which permit said nut to slide in the eye to whatever point may be desired, the height of the eye being less than the full diameter of the nut.

Nut $f$ carries a shank with which a locking-ring $g$, provided with pins $g'$ $g'$, Fig. 5, engages. Said locking-ring is held in position by a corresponding flange $f^2$, but it is independent of the nut as far as rotative motion is concerned, Figs. 1 and 4. The eye $a^2$ is also provided with two recesses $a^3$, which are slightly larger than the thickness of the nut $f$ and of the locking-ring $g$, which is provided with aforesaid pins or tenons. Further, the front ends of the two branches which form the eye $a^2$ are provided with holes $a^4$, designed to receive pins $g'$ of locking-ring $g$, so that said two pins when placed in their proper positions guard against the spreading apart of the two branches which form the eyepiece.

For the purpose of placing nut $f$ and locking-ring $g$ in position the nut is first placed forward far enough within the eyepiece so that the locking-ring can be introduced into the mortised portion $a^3$ of the latter sidewise. Then the locking-ring is turned so as to bring pins $g'$ opposite the corresponding holes $a^4$. Then screw $e'$ is passed through said locking-ring and nut $f$. Afterward the nut is turned backward. The pins $g'$ enter into their seats. Then independent nut or flange $f^2$ is attached to screw $e'$ and screwed along the same, so as to rest against the locking-ring, and after that the locking-ring can neither revolve nor recede, and the pins at the same time prevent the branches of the eyepiece from spreading apart. Nut $f$, being then just opposite the mortised portion $a^3$ of the eye piece, can be turned, and as it is provided with thread corresponding with the thread of the screw when the regulating-screw $e'$ is being turned the nut will come to rest against the locking-ring and cannot then turn any farther. This will compel the advancement of the screw and will consequently result in the displacement of shoe e and of axle d, whereby, as will be seen, adjustment of the chain can be readily obtained.

Having thus described my invention, what I claim as new, and desire to secure by Letters Patent, is—

1. In a bicycle, the combination with a recessed fork, of a shoe carrying the axle of the propelling-wheel and adjusted to slide in said fork, a threaded stem for actuating said shoe, a notched nut as $f$ in engagement with said stem and adapted to partly embrace the arms of the fork to permit assembling of the parts, and a locking device adjusted to be inserted in the recessed portion of the fork, and engaging therewith and adapted to lock the free ends of the fork, substantially as set forth.

2. In a bicycle, the combination with a recessed fork, of a shoe carrying the axle of the propelling-wheel and adjusted to slide in said fork, a threaded stem for actuating said shoe, a notched nut as $f$ in engagement with said stem and adapted to partly embrace the arms of the fork to permit assembling of the parts and a locking-ring, as $g$, adjusted to be inserted in the recessed portion of the fork and provided with securing-pins adapted to engage the free ends of the fork, substantially as set forth.

In testimony that I claim the foregoing as my invention I have signed my name, in presence of two witnesses, this 31st day of October, A. D. 1894.

PIERRE AMBJORN COMTE DE SPARRE.

Witnesses:
   CHARLES THIERRY,
   CLYDE SHROPSHIRE.